United States Patent
Fiorenza De Lima et al.

(10) Patent No.: US 12,055,005 B2
(45) Date of Patent: Aug. 6, 2024

(54) JUNCTION BOX FOR CONNECTING TWO UMBILICAL SECTIONS

(71) Applicant: PETROLEO BRASILEIRO S.A.—PETROBRAS, Rio de Janeiro (BR)

(72) Inventors: Henri Fiorenza De Lima, Vila Velha (BR); Roberto Loschiavo, Vitoria (BR); Luis Fernando Alves Ferreira, Vitoria (BR); Gustavo Geraldo Pappen, Vitoria (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 450 days.

(21) Appl. No.: 17/295,223

(22) PCT Filed: Nov. 21, 2019

(86) PCT No.: PCT/BR2019/050499
§ 371 (c)(1),
(2) Date: May 19, 2021

(87) PCT Pub. No.: WO2020/102873
PCT Pub. Date: May 28, 2020

(65) Prior Publication Data
US 2022/0010643 A1    Jan. 13, 2022

(30) Foreign Application Priority Data

Nov. 21, 2018 (BR) .......................... 102018073829-1

(51) Int. Cl.
*E21B 33/038* (2006.01)
*E21B 43/013* (2006.01)
(Continued)

(52) U.S. Cl.
CPC .......... *E21B 33/038* (2013.01); *E21B 43/013* (2013.01); *F16L 1/26* (2013.01); *F16L 39/02* (2013.01)

(58) Field of Classification Search
CPC ....... E21B 33/038; E21B 33/0387; F16L 1/26
See application file for complete search history.

(56) References Cited

U.S. PATENT DOCUMENTS 3,280,908 A * 10/1966 Todd ..................... E21B 17/012
166/341
3,840,071 A * 10/1974 Baugh .................. E21B 33/038
166/344

(Continued)

FOREIGN PATENT DOCUMENTS

EP      1030094 A3    10/2001
GB      2216618 B      3/1992
(Continued)

OTHER PUBLICATIONS

International Search Report for PCT International Application No. PCT/BR2019/050499, dated Jan. 9, 2020.

*Primary Examiner* — Reinaldo Sanchez-Medina
(74) *Attorney, Agent, or Firm* — RAPHAEL BELLUM PLLC

(57) ABSTRACT

The present invention relates to junction boxes for umbilicals. In this context, the present invention provides a junction box for connecting two umbilical sections, comprising a plurality of main pipes (2), suitable for individually connecting a plurality of hydraulic hoses (I) of a first umbilical section to a plurality of hydraulic hoses (I) of a second umbilical section, in which the junction box also comprises an auxiliary pipe network (3) hydraulically connecting all of the main pipes (2).

6 Claims, 2 Drawing Sheets

(51) Int. Cl.
    *F16L 1/26*    (2006.01)
    *F16L 39/02*    (2006.01)

(56)        References Cited

U.S. PATENT DOCUMENTS 4,194,568 A  *  3/1980  Buresi .................. E21B 33/038
                                                    166/359
    9,091,146 B1     7/2015  Whiddon
    9,803,445 B2 *  10/2017  Nguyen ................. E21B 33/03
   10,480,274 B2 *  11/2019  Donald ................. E21B 33/076
 2010/0052316 A1     3/2010  Smith

FOREIGN PATENT DOCUMENTS

GB           2552693 A    2/2018
 GB           2553354      3/2018
 WO        2010019290 A1   2/2010

* cited by examiner

JUNCTION BOX FOR CONNECTING TWO UMBILICAL SECTIONS

FIELD OF THE INVENTION

The present invention is related to pipeline and riser technologies. More specifically, the present invention relates to a junction box for subsea umbilicals.

BACKGROUND OF THE INVENTION

Recurring problems with failures in hydraulic umbilical hoses in operation are the cause of significant production losses in oil- or gas-producing wells. These failures may be caused by design, manufacturing, installation, and operational problems, as well as by accidents caused by third parties.

These failures are usually difficult to detect, or it is difficult to determine the exact point at which they are located so that they can be handled in the best way, replacing fewer sections, and reducing impacts with regard to the necessary time, ship resources, and materials used.

Depending on the type, the number of hydraulic functions, and the distance from the wells they serve, the umbilicals may be comprised of one or more sections, and it is precisely when an umbilical has two or more of these segments that use of the invention is justified.

When any hydraulic function is lost (leakage with or without pressure-holding capability), the point of leakage may be anywhere between the HPU (Hydraulic Power Unit) or the "TUTU Plate" (considering that a leak on the surface can be easily identified and isolated), present on the production platform, and the subsea valve actuator to which it is aligned, passing through several components, including steel tubing, connectors, thermoplastic hoses, directional valves, sealing systems, etc.

As a rule, since the wells are located from a few hundred meters to up to several dozens of kilometers away from the unit, it is very common for there to be leakage at some point along the thermoplastic hoses. Also depending on the length of each section, which can be anywhere between three and four kilometers, it is often very difficult to find the exact point of the leak. Umbilicals have backup functions, but need to be replaced when the number of failures reaches a critical level; they are usually replaced in their entirety.

Thus, after identifying the exact section where the umbilical has a leak, and even if the problem is not in the umbilical, the situation can be handled optimally, avoiding complete replacement of the umbilical or other unnecessary operations.

Another issue that can occur with an umbilical hose is blockage due to clogging caused by a variety of reasons, including the accumulated residue from the internal housing of chemical injection hoses, the chemical reaction between incompatible products, and the formation of hydrate in the hydraulic control hoses, caused by migration of gas from the producing well.

There are three different types of hoses in an umbilical, to wit: hoses attached to low-pressure valves (typically 210 bar), hoses attached to high-pressure valves (typically 345 bar), and chemical injection hoses. The first two types work with the same fluid, while the third type can work with different fluids, but they are usually compatible with each other. It is therefore essential that there be at least two independent circuits: one for the hydraulic fluid (typically nine hoses measuring ⅜") and another for the other chemical products (typically three ½" hoses).

For convenience the hoses may also be grouped two by two, three by three, or in other combinations on independent circuits.

Between one section and another of an umbilical, there is an element known as a junction box (as shown in FIG. 1), inside of which the hoses from both sections are connected to each other, ensuring an aligned circuit for pressurization and opening of the desired subsea valve. However, the current junction boxes do not allow each section of an umbilical to be isolated so that tests can be run to find the problem impacting the section in question, as will be evident from the documents in the state of the art listed below.

This junction box could also be used to connect the umbilical and the Vertical Connection Module (MCV), which connects the umbilical to the Christmas tree, maximizing the benefits of the proposed technology, and allowing it to bypass hoses that have failed in this last section.

Document U.S. Pat. No. 5,265,980A discloses a junction box unit for a subsea structure in an offshore oil field that has first and second junction plates joined by a shaft connector, with low risk of damage during installation, and it prevents particles from entering. The junction box assembly in this document has a first junction box with a plurality of control connections, a second junction box with a second plurality of control connections, and a connector that generally extends in the center of the first junction box to hook to an enclosure in the second junction box.

Document U.S. Pat. No. 8,746,346B2 discloses an electrical and hydraulic configuration in a subsea Christmas tree that facilitates the use of an ROV (Remotely Operated Vehicle) control system to operate the tree during well installations, interventions, and workovers. An SCM (Subsea Control Module) in the tree also communicates with a fixed junction box that receives a production umbilical during normal operation. The described junction box is configured to connect to the ROV and, thus establish communication with the hydraulic lines from the SCM.

Document EP2,886,921B1 discloses a connection system to facilitate the subsea connection of a first subsea umbilical to a second subsea umbilical, which has an actuator unit to move the termination box and the final section of a subsea umbilical forward axially in relation to the connection unit.

Document US20080110633A1 discloses a method for operating a grounding cable for use in offshore wells that involves establishing control of the pipe hanger and establishing control of completion of the assembly of lower orifices. According to this document, the method involves performing hydraulic control from a floating platform, using an umbilical control system to a junction plate that is operatively connected to a subsea producing Christmas tree. However, no details about the junction plate are provided in this document.

Document WO2016167742A1 discloses a riser Christmas tree control adapter, which comprises an adapter control connector that communicates between the umbilical control connection and the pipe. According to that document, the adapter has a Christmas tree control adapter with an adapter housing, an orientation port, an orientation pin, an internal connection interface, and a control umbilical junction plate control.

As will be more fully detailed below, the present invention seeks to resolve the problems in the state of the art described above in a practical and efficient manner.

SUMMARY OF THE INVENTION

The objective of the present invention is to provide a junction box that allows each section of the umbilical to be isolated so that tests can be performed, in order to define the problem that is impacting the section in question.

In order to achieve the objectives described above, the present invention provides a junction box for connecting two umbilical sections, comprising a plurality of main pipes adapted to individually connect a plurality of hydraulic hoses from a first umbilical section to a plurality of hydraulic hoses of a second umbilical section, in which the junction box further comprises a network of auxiliary pipes hydraulically connecting all the main pipes.

BRIEF DESCRIPTION OF THE FIGURES

The detailed description presented below references the attached figures and their respective reference numbers.

DETAILED DESCRIPTION OF THE INVENTION

First, note that the following description will begin from a preferred embodiment of the invention. As will be apparent to any person skilled in the art, however, the invention is not limited to that particular embodiment.

Figure 1:
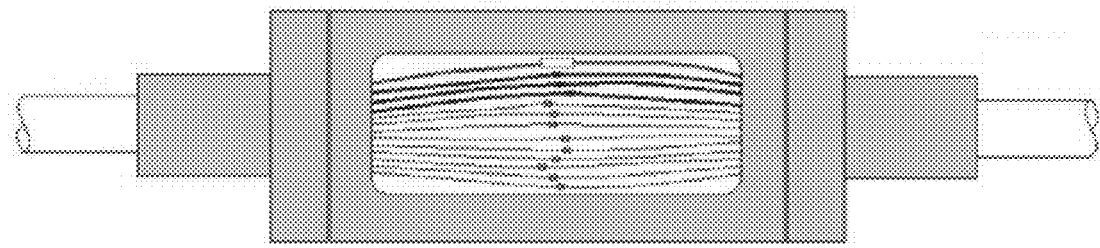
FIG. 1 shows a junction box as known in the current state of the art.

As noted earlier in this report, FIG. 1 shows a junction box as known in the current state of the art. In this traditional configuration, the junction box comprises hoses directly interconnected to subsequent sections of hoses.

The invention is in relation to the sophistication of this equipment, which uses piping and valve systems that allow each section to be isolated inside a junction box and to perform tests to outline the problem.

Figure 2:
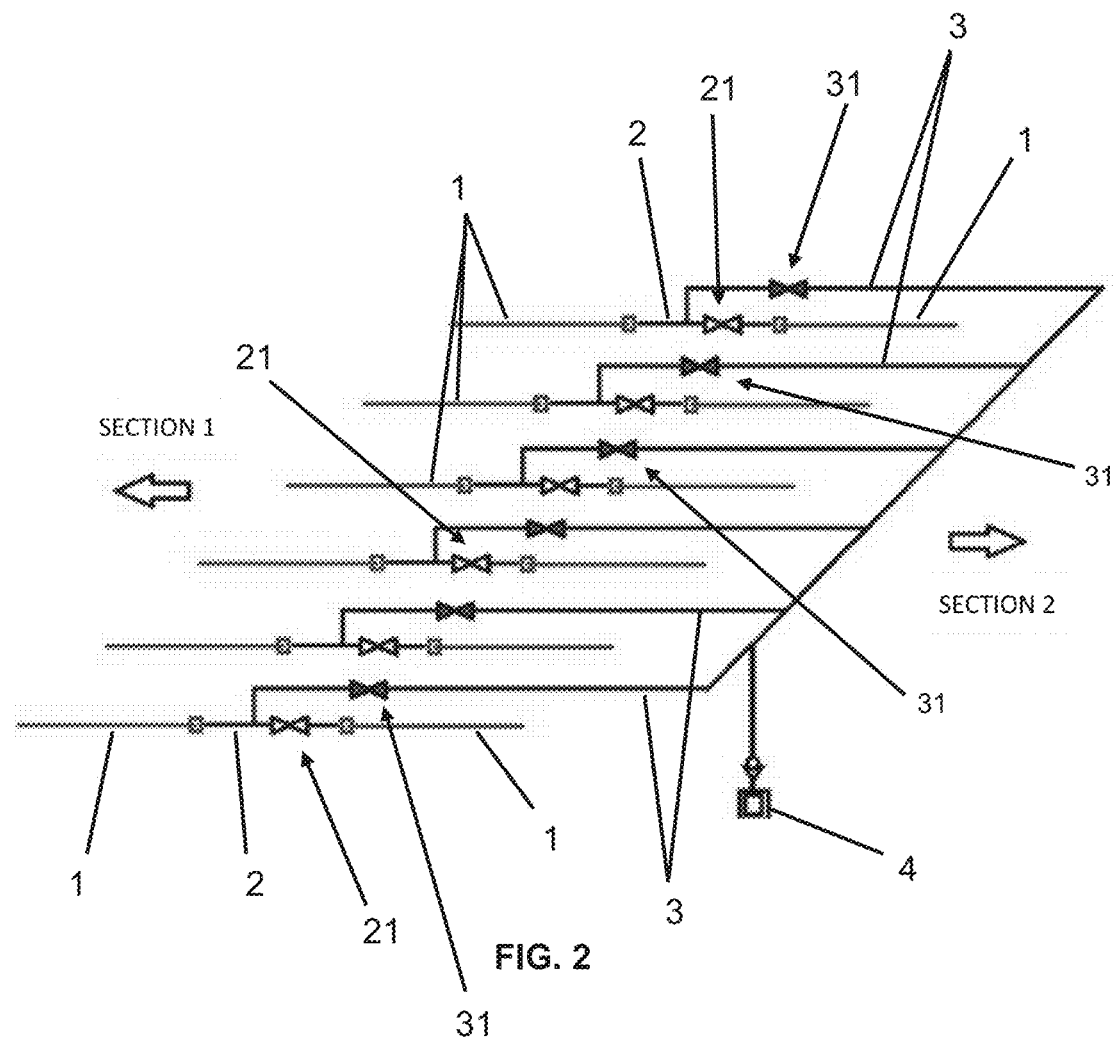
FIG. 2 shows a schematic view of the proposed configuration of the junction box of the present invention.

FIG. 2 shows a schematic view of the proposed configuration of the junction box of the present invention. More broadly, the junction box of the present invention comprises a plurality of main pipes 2 (steel tubing) adapted to individually connect a plurality of hydraulic hoses 1 from a first umbilical section to a plurality of hydraulic hoses 1 from a second umbilical section, in which the junction box further comprises an auxiliary pipe network 3 hydraulically connecting all the main pipes 2.

Optionally, the auxiliary pipe network 3 may comprise an auxiliary valve 31 for each main piping element 2, wherein each auxiliary valve 31 is adapted to control the hydraulic flow of each auxiliary piping element 2.

Figure 3:
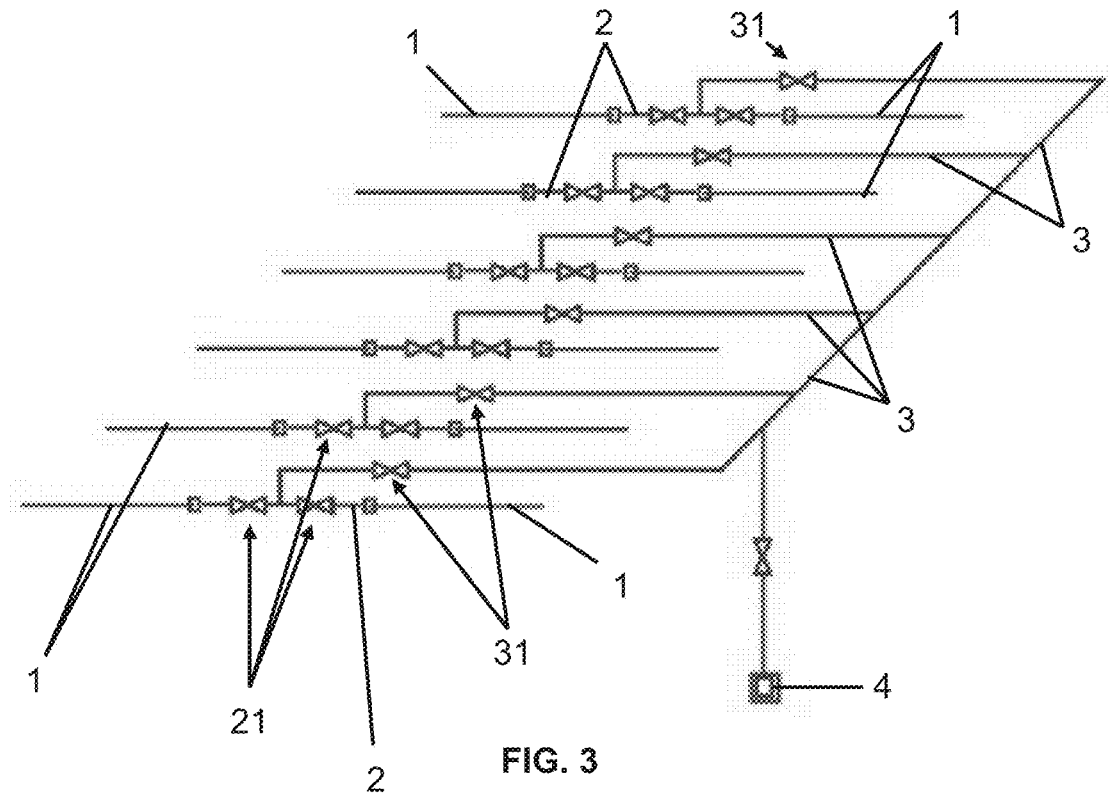
FIG. 3 shows a schematic view of an alternative configuration of the junction box proposed for the present invention.

FIG. 3 shows a schematic view of an alternative configuration of the junction box proposed for the present invention.

In addition, optionally, each main piping element comprises at least one valve 21 adapted to control the flow from each hydraulic line 1 of at least one of the sections.

As shown in FIG. 2, each main piping element 2 can comprise only one valve 21 to control the flow of hydraulic lines 1 from just one of the umbilical sections. In the configuration shown in FIG. 3, each main piping element 2 may comprise two valves 21 to control the flow from the hydraulic lines 1 of both umbilical sections. This second configuration allows the hoses to be tested independently and not just one of them independent of the second, allowing greater flexibility and assertiveness of the aforementioned tests, both for leakage and for blockages due to clogging.

Thus, a control system and valves 21, 31 is provided, which allows the flow to be diverted between non-subsequent hydraulic lines 1. In other words, the described junction box makes it possible to divert the flow from a hydraulic line from an umbilical section to a non-subsequent hydraulic line from the next umbilical section, through the described piping network.

All valves 21 and 31 must be accessible for operation by divers or using an ROV, including providing redundancies as a function of the position to be used by the junction box after its launch.

Optionally, a pressurizing valve 4 hydraulically connected to the network of pipes from the junction box can be used, which pressurization valve may be either a ball valve or a check valve. This valve must be accessible by divers or via ROV for its control.

Figure 4:
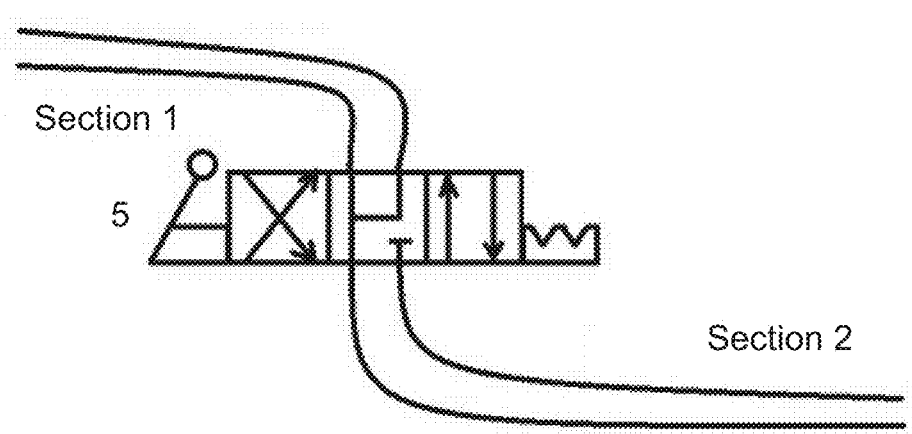
FIG. 4 shows a schematic view of a directional valve, which may or may not be used, in conjunction with the hydraulic circuit of the junction box of the present invention (FIG. 2) or with the alternative configuration (FIG. 3).

FIG. 4 shows a schematic view of a directional valve that may optionally be used together with the junction box of the present invention. This configuration shows that the flow from an umbilical hydraulic hose can be diverted to a non-subsequent hydraulic valve of a second umbilical.

Other directional valve arrangements may be used, allowing combinations of alignments, bringing operational flexibility, independent of the hoses that fail, without the need to change the design of a Christmas tree layer, for example.

Another possibility allowed by this invention is the possibility of making several alignments that can resolve issues in a simplified manner, without having to replace a defective section, simply by changing the configuration and the circuit through which the hydraulic fluid runs.

Thus, the present invention makes it possible to identify whether the umbilical itself is the source of the problem, and in which section the leak is located, allowing the problem to be handled more effectively, and preventing replacement of the entire section, positively impacting costs using ship resources, which are traditionally very expensive in this type of situation.

The invention claimed is:

1. A junction box for connecting a first umbilical section and a second umbilical section, the junction box comprising:
    a plurality of first hydraulic hoses associated with the first umbilical section;
    a plurality of second hydraulic hoses associated with the second umbilical section;
    a plurality of main pipes, each of the plurality of main pipes connecting one of the plurality of first hydraulic hoses associated with the first umbilical section with one of the plurality of second hydraulic hoses associated with the second umbilical section; and
    an auxiliary piping network hydraulically connecting all the plurality of main pipes,
    wherein the auxiliary piping network comprises an auxiliary valve for each of the plurality of main pipes,
    wherein each auxiliary valve controls a hydraulic flow of each auxiliary piping element, and
    wherein each of the plurality of main pipes comprises a valve to control the flow from the first umbilical section or the second umbilical section.

2. The junction box of claim 1, further comprising:
    a pressurization valve hydraulically connected to the auxiliary piping network of the junction box,
    wherein the pressurization valve is a ball valve or a check valve.

3. The junction box of claim 1, further comprising:
    a directional valve interconnecting the first umbilical section and the second umbilical section,
    wherein the directional valve is configured to divert a flow from the second umbilical section or invert a flow from one of the first umbilical section or the second umbilical section.

4. The junction box of claim 1,
    wherein a first of the plurality of first hydraulic hoses has a first axis, wherein a first of the plurality of second hydraulic hoses has a second axis,
wherein a first of the plurality of main pipes connects the first of the plurality of first hydraulic hoses and the first of the plurality of second hydraulic hoses,
wherein the first of the plurality of main pipes has a third axis, and
wherein the first axis, the second axis, and the third axis are aligned.

5. The junction box of claim 1,
wherein the auxiliary piping network comprises a plurality of connectors,
wherein each of the plurality of the connectors are connected to one main pipe,
wherein a first portion of a first of the plurality of the connectors is perpendicularly attached to a first main pipe.

6. The junction box of claim 5, wherein a second portion of the first of the plurality of the connectors is parallel to the first main pipe, a first of the plurality of the first hydraulic hoses, and a first of the plurality of the second hydraulic hoses.

* * * * *